(12) United States Patent
Quillen

(10) Patent No.: US 6,458,915 B1
(45) Date of Patent: Oct. 1, 2002

(54) PROCESS FOR PRODUCING POLY(1,4-CYCLOHEXYLENEDIMETHYLENE 1,4-CYCLOHEXANEDICARBOXYLATE) AND THE REACTOR GRADE POLYESTER THEREFROM

(75) Inventor: Donna Rice Quillen, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 09/764,931

(22) Filed: Jan. 18, 2001

Related U.S. Application Data

(60) Provisional application No. 60/240,432, filed on Oct. 13, 2000.

(51) Int. Cl.[7] .............................................. C08G 64/00
(52) U.S. Cl. .................... 528/272; 528/176; 528/271
(58) Field of Search .............................. 528/176, 271, 528/272

(56) References Cited

U.S. PATENT DOCUMENTS

| | | |
|---|---|---|
| 2,465,319 A | 3/1949 | Whinfield et al. |
| 2,891,930 A | 6/1959 | Caldwell et al. |
| 2,901,466 A | 8/1959 | Kibler et al. |
| 3,271,370 A | 9/1966 | Akin et al. |
| 4,349,469 A | 9/1982 | Davis et al. |
| 4,897,453 A | 1/1990 | Flora et al. |
| 5,231,218 A | 7/1993 | Sumner, Jr. et al. |
| 5,399,661 A | 3/1995 | Borman |
| 5,453,479 A | 9/1995 | Borman et al. |
| 5,486,562 A | 1/1996 | Borman et al. |
| 5,498,668 A | 3/1996 | Scott |
| 5,907,026 A | 5/1999 | Factor et al. |
| 5,939,519 A | 8/1999 | Brunelle |
| 5,986,040 A | 11/1999 | Patel et al. |
| 6,084,055 A | 7/2000 | Brunelle et al. |

FOREIGN PATENT DOCUMENTS

| | | |
|---|---|---|
| EP | 0 902 052 A1 | 3/1999 |

OTHER PUBLICATIONS

E.V. Martin and C.J. Kibler, pp. 83–134, in "Man–Made Fibers: Science and Technology", vol. III, edited by Mark, Atlas and Cernia, 1968.

Wilfong in J. Polymer Sci., vol. 54, 385–410 (1961).

*Primary Examiner*—Terressa M. Boykin
(74) *Attorney, Agent, or Firm*—Cheryl J. Tubach; Bernard J. Graves, Jr.

(57) ABSTRACT

In a process for producing a reactor grade polyester, a poly(1,4-cyclohexylenedimethylene 1,4-cyclohexanedicarboxylate) has a reduced amount of isomerization of the trans-isomer to the cis-isomer of 1,4-dimethylcyclohexanedicarboxylate and an increased polymerization rate by the addition of a phosphorus-containing compound to the reaction process. In step (a) of the process, a diacid comprising at least 80 mole percent 1,4-cyclohexanedicarboxylic acid or an ester derivative of the diacid comprising at least 80 mole percent 1,4-dimethylcyclohexanedicarboxylate is reacted with a glycol comprising at least 80 mole percent 1,4-cyclohexanedimethanol at a temperature sufficient to effect esterification for the diacid or transesterification for the ester derivative. In step (b), the product of step (a) is subjected to temperatures and pressures in the presence of a suitable catalyst to effect polycondensation. Phosphorus in an amount of 1 to 800 ppm is added in the form of a phosphorus-containing compound during the process.

40 Claims, 3 Drawing Sheets

US 6,458,915 B1

PROCESS FOR PRODUCING POLY(1,4-CYCLOHEXYLENEDIMETHYLENE 1,4-CYCLOHEXANEDICARBOXYLATE) AND THE REACTOR GRADE POLYESTER THEREFROM

RELATED INFORMATION

This application claims the benefit of United States Provisional Application Ser. No. 60/240,432 filed Oct. 13, 2000 titled "Process for Producing Poly(1,4-cyclohexylenedimethylene 1,4-cyclohexanedicarboxylate) and the Reactor Grade Polyester Therefrom".

TECHNICAL FIELD OF THE INVENTION

This invention relates to processes for the production of poly(1,4-cyclohexylenedimethylene 1,4-cyclohexanedicarboxylate and, more particularly, to processes that have a reduced amount of isomerization of dimethyl trans-1,4-cyclohexanedicarboxylate to dimethyl cis-1,4-cyclohexanedicarboxylate and increased polymerization rates through the addition of certain phosphorus-containing compounds to the polymerization process.

BACKGROUND OF THE INVENTION

Polyesters of cycloaliphatic diacids and cycloaliphatic diols were first disclosed in U.S. Pat. No. 2,891,930 to Caldwell et al. and are useful in a number of applications, such as in blends with polycarbonate, polyacrylate and other polyesters. U.S. Pat. No. 5,486,562 to Borman et al. discloses blends of poly(alkylene cyclohexanedicarboxylate) and amorphous copolymer resins. U.S. Pat. No. 5,498,668 to Scott discloses blends of an aliphatic or cycloaliphatic polyester with an acrylic polymer. European Patent Application 0 902 052 A1 to Hoefflin et al. discloses an aliphatic polyester-acrylic blend molding composition. Compositions comprising a polycarbonate, a cycloaliphatic resin, an ultraviolet light absorber and a catalyst quencher are disclosed in U.S. Pat. No. 5,907,026, to Factor et al.

Cycloaliphatic polyesters are generally prepared by reacting a cycloaliphatic diol, such as 1,4-cyclohexanedimethanol (CHDM), and a cycloaliphatic diacid or its ester derivative, such as 1,4-dimethylcyclohexanedicarboxylate (DMCD), in a two-stage process typical of linear polyesters. One such process is that described in U.S. Pat. No. 2,465,319 to Whinfield et al. A useful polyester of this type is poly(1,4-cyclohexylenedimethylene 1,4-cyclohexanedicarboxylate), hereafter referred to as PCCD.

In the first stage of the process for preparing PCCD, CHDM and DMCD are reacted in the presence of a suitable catalyst to effect an ester interchange reaction. Ester interchange is typically carried out at temperatures ranging from 180 to 220° C. Catalysts that can be used for ester interchange include titanium, lithium, magnesium, calcium, manganese, cobalt, zinc, sodium, rubidium, cesium, strontium, chromium, barium, nickel, cadmium, iron and tin. Normal concentrations of catalyst are in the range of 1 to 500 ppm. Most commonly, titanium is used as the ester exchange catalyst for PCCD. Typically, low molar ratios of diol to diester are used because of the difficulty in the second stage of removing large excesses of high-boiling CHDM diol during polycondensation. Thus, the degree of polymerization that can be obtained in a reasonable length of time is limited (E. V. Martin and C. J. Kibler, pp. 83–134, in "Man-Made Fibers: Science and Technology", vol. III, edited by Mark, Atlas and Cernia, 1968). A stoichiometric amount of diol to diester can be used, or if appreciable amounts of the diester are lost due to volatilization, a slight molar excess of the diester can be used. The reaction product at the end of ester interchange in the first stage consists of low molecular weight polymer with an average degree of polymerization of about 2 to 10.

In the second stage, polycondensation is effected by advancing the temperature to around 260 to 290° C. and applying a vacuum of 0.5 to 1.0 torr to aid in the removal of reaction byproducts. Metals such as titanium, antimony, tin, gallium, niobium, zirconium, aluminum, germanium or lead can be used to catalyze polycondensation and are typically present in the range of 1 to 500 ppm. Most commonly, titanium is used as the polycondensation catalyst for PCCD. Polycondensation can also be carried out in the solid phase. In this procedure, the low-molecular prepolymer is isolated, solidified and granulated. The solid prepolymer is then heated at a temperature about 20 to 40° C. below its melting point under a vacuum or in the presence of a flow of nitrogen.

CHDM and DMCD exist as both cis and trans geometric isomers. The equilibrium concentration of isomers in DMCD is 65% trans and 35% cis. DMCD having a trans isomer content greater than the equilibrium concentration can be produced by a number of processes, such as the one described in U.S. Pat. No. 5,231,218 to Sumner et al. For the most useful polymer properties, the starting DMCD used to make PCCD should have a trans content greater than the equilibrium amount of 65%. Preferably, the amount of trans isomer in the starting DMCD monomer is greater than 98% by weight and the amount of cis-isomer is less than 2% by weight. The starting CHDM monomer as supplied typically contains 70% by weight of the trans-isomer and 30% by weight of the cis-isomer. A high level of trans units is desired because incorporation of cis-CHDM or cis-DMCD units into the polymer chain disrupts the chain regularity, lowers the melting point and reduces the amount of crystallinity than can develop in the polymer, as described by Wilfong in J. Polymer Sci., vol. 54, 385–410 (1961).

One disadvantage of the usual process for preparing PCCD is that some of the trans-DMCD units isomerize to the cis-isomer during the polymerization process, thus lowering the melting point of the polymer and reducing the amount of crystallinity in the polymer. The amount of isomerization of the trans-DMCD units that occurs during the polymerization is dependent on several factors, including catalyst type and concentration, reaction temperature and residence time in the reactor. Processes that require a shorter time in the reactor are desirable because there is less time available for the trans-DMCD to undergo isomerization to the cis-isomer. Normally there is no isomerization of the trans-CHDM units during the polymerization process. FIG. 1 illustrates the effect of cis-DMCD units in the polymer chain on the melting point of PCCD. The melting point decreases by about 2° C. for every 1 % increase in cis-DMCD units.

U.S. Pat. No. 5,939,519 to Brunelle describes the need for higher crystallinity PCCD. The process requires incorporation of amide segments at up to about 18 mole percent based on total ester and amide segments into PCCD in order to increase the crystallinity, which adds considerable cost to the polymer.

U.S. Pat. No. 6,084,055 to Brunelle discloses a method for the preparation of poly(1,4-cyclohexane dicarboxylates) with maximum molecular weight and crystallinity. The reaction is conducted in a series of progressively increasing temperatures below 265° C. with a residence time in the range of 40 to 120 minutes at temperatures above 250° C., and/or the reaction is conducted with an initial stage of the reaction in the presence of at least one $C_{2-6}$ aliphatic diol. While satisfactory results may be obtained using this method, the narrow temperature range and residence time requirements are undesirable because polymerization rates are limited.

U.S. Pat. No. 5,986,040 to Patel et al. discloses crystalline PCCD resins in which the trans-cis ratio of repeating units from DMCD in the polymer is greater than about 6 to 1, and the trans-cis ratio of repeating units derived from CHDM is greater than about 1 to 1 in the polymer. The polyester has a viscosity greater than about 4200 poise and a melting temperature in the range of about 216 to about 230° C. A process to produce this polymer is also disclosed. Patel teaches the importance of the starting mole ratio of DMCD to CHDM to control the extent of trans-to-cis isomerization of DMCD. The addition of phosphite compounds to PCCD as color stabilizers is disclosed, although none of the examples indicate that stablilizers were added.

U.S. Pat. No. 5,453,479 to Borman et al. discloses the use of a polyesterification catalyst consisting of a phosphorus compound and a titanium compound to prepare polyesters for blending with polycarbonates. The process advantages are an increased in the strength and mold cycle time of the blend.

The post-reaction addition of phosphite quenchers in blends of polycarbonate, cycloaliphatic polyesters, and ultraviolet light absorbers is disclosed in U.S. Pat. No. 5,907,026 to Factor et al. The phosphite catalyst quencher is added in the post-reaction blending of PCCD with other polymers.

Thus, there exists a need in the art for a fast, simple, cost-effective process for preparing PCCD with a reduced level of isomerization of the trans-DMCD units to cis-DMCD units. Accordingly, it is to the provision of such process that the present invention is primarily directed.

BRIEF SUMMARY OF THE INVENTION

In a process for producing a reactor grade polyester, a poly(1,4-cyclohexylenedimethylene 1,4-cyclohexanedicarboxylate) has a reduced amount of isomerization of the trans-isomer to the cis-isomer of 1,4-dimethylcyclohexanedicarboxylate and an increased polymerization rate by the addition of a phosphorus-containing compound to the reaction process. The process comprises the steps of:

a) reacting a diacid comprising at least 80 mole percent 1,4-cyclohexanedicarboxylic acid or an ester derivative of the diacid comprising at least 80 mole percent 1,4-dimethylcyclohexanedicarboxylate and a glycol comprising at least 80 mole percent 1,4-cyclohexanedimethanol at a temperature sufficient to effect esterification for the diacid or transesterification for the ester derivative;

b) polycondensing the product of step (a) at temperatures and pressures in the presence of a suitable catalyst to effect polycondensation;

c) adding 1 to 800 ppm phosphorus, wherein all parts by weight are based on the weight of the polyester and the phosphorus is added in the form of a phosphorus-containing compound; and d) after step (c) removing a reactor grade polyester of poly(1,4-cyclohexylenedimethylene 1,4-cyclohexanedicarboxylate) having an inherent viscosity of 0.4 to 2.0 dL/g.

The phosphorus-containing compound is selected from the group consisting of:

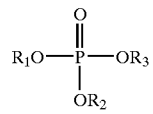

(1) a phosphate ester having the formula:
wherein $R_1$ is a hydrogen atom or a $C_1$–$C_{20}$ radical, which optionally includes O, Cl or Br atoms, and $R_2$ and $R_3$ are the same $C_1$–$C_{20}$ radical or a combination of different $C_1$–$C_{20}$ radicals, which optionally include O, Cl or Br atoms;

(2) a phosphate ester having the formula:

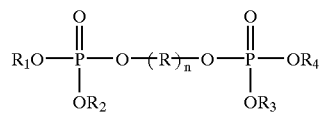

wherein R is derived from a diol; $R_1$ and $R_4$ can be hydrogen atoms or $C_1$–$C_{20}$ radicals, which optionally include O, Cl or Br atoms; and $R_2$ and $R_3$ are the same $C_1$–$C_{20}$ radical or a combination of different $C_1$–$C_{20}$ radicals, which optionally include O, Cl or Br atoms;

(3) a diphosphate ester having the formula:

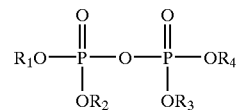

wherein $R_1$ and $R_4$ can be hydrogen atoms or $C_1$–$C_{20}$ radicals, which optionally include O, Cl or Br atoms, and $R_2$ and $R_3$ are the same $C_1$–$C_{20}$ radical or a combination of different $C_1$–$C_{20}$ radicals, which optionally include O, Cl or Br atoms; and (4) a phosphonate ester having the formula:

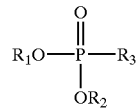

wherein $R_1$ is a hydrogen atom or a $C_1$–$C_{20}$ radical, which optionally includes O, Cl or Br atoms, and $R_2$ and $R_3$ are the same $C_1$–$C_{20}$ radical or a combination of different $C_1$–$C_{20}$ radicals, which optionally include O, Cl or Br atoms.

Further, a reaction product polyester composition of poly (1,4-cyclohexylenedimethylene 1,4-cyclohexanedicarboxylate) is produced having an inherent viscosity of 0.4 to 2.0 dL/g. The polyester composition comprises a diacid component of residues of at least about 80 mole percent of 1,4-cyclohexanedicarboxylic acid, based on 100 mole percent diacid component; a glycol component of residues of at least about 80 mole percent of 1,4-cyclohexanedimethanol, based on 100 mole percent glycol component; 0 to 500 ppm esterification catalyst or 1 to 500 ppm transesterification catalyst; 1 to 500 ppm polycondensation catalyst, and 1 to 800 ppm phosphorus from a phosphorus-containing compound as described above. All parts per weight are based on the weight of the polyester.

DETAILED DESCRIPTION OF THE INVENTION

Figure 1:
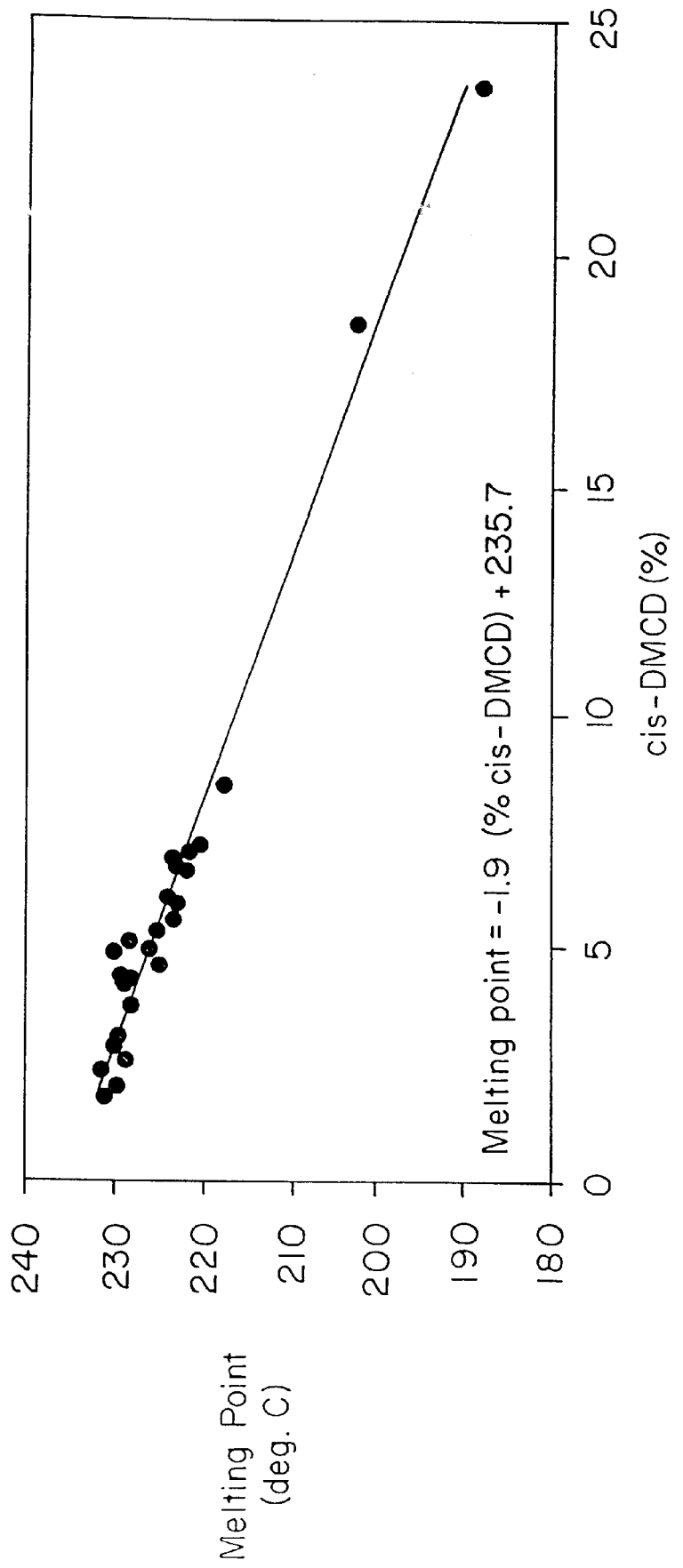
FIG. 1 is a graph of melting point versus percentage of cis-DMCD units illustrating the effect of cis-DMCD units in the polymer chain on the melting point of PCCD.

This invention relates to a process for the preparation of poly(1,4-cyclohexylenedimethylene 1,4-cyclohexanedicarboxylate) (PCCD) having a reduced level of cis-1,4-dimethylcyclohexanedicarboxylate (cis-DMCD) units in the polymer chain and an increased polymerization rate. By the addition of certain phosphorus-containing compounds to the process for preparing PCCD from 1,4-cyclohexanedimethanol (CHDM) and 1,4-dimethylcyclohexane-dicarboxylate (DMCD), the amount of isomerization of trans-DMCD units to cis-DMCD units is decreased and the polymerization rate is increased. Controlling the isomerization of trans-DMCD units is important to the process for producing PCCD because any increase in cis-DMCD units results in a lower melting point polymer and a reduction in the crystallinity of the polymer.

The present invention is a process for producing a reactor grade polyester of PCCD as distinguished from a blend of polymers to produce the polyester. The reactor grade polyester thus produced has an inherent viscosity of 0.4 to 2.0 dL/g and has repeat units from a diacid component comprising repeat units from at least about 80 mole percent of 1,4-cyclohexanedicarboxylic acid and a glycol component comprising repeat units from at least about 80 mole percent of 1,4-cyclohexanedimethanol. The repeat units of 1,4-cyclohexanedicarboxylic acid (CHDA) can be derived from either the acid itself or, preferably, its ester derivative of DMCD. The mole percentages of the diacid component and the glycol component are both based on 100 mole percent. In the process, the diacid component and the glycol component are reacted at a temperature sufficient to effect esterification when utilizing CHDA or transesterification when utilizing DCMD. The reaction product of the diacid component and glycol component is then subjected to polycondensation at temperatures and pressures in the presence of a suitable catalyst to effect polycondensation.

The distinguishing feature of the present invention is the addition of phosphorus in the form of certain phosphorus-containing compounds to the process for preparing PCCD. The phosphorus is added in an amount of 1 to 800 parts per million (ppm), preferably 1 to 310 ppm and more preferably 5 to 91 ppm. The parts by weight of the phosphorus added are the parts of the elemental phosphorus and are based on the weight of the reactor grade polyester produced by the process. However, the phosphorus is not added to the process in its elemental form but rather added to the process in the form of certain phosphorus-containing compounds. The phosphorus-containing compounds used are selected from the group consisting of the following:

(1) a phosphate ester having the formula:

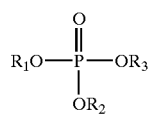

wherein $R_1$ is a hydrogen atom or a $C_1$–$C_{20}$ radical, which optionally includes O, Cl or Br atoms, and $R_2$ and $R_3$ are the same $C_1$–$C_{20}$ radical or a combination of different $C_1$–$C_{20}$ radicals, which optionally include O, Cl or Br atoms;

(2) a phosphate ester having the formula:

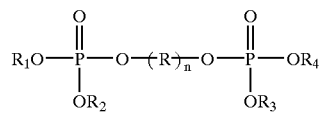

wherein R is derived from a diol; $R_1$ and $R_4$ can be hydrogen atoms or $C_1$–$C_{20}$ radicals, which optionally include O, Cl or Br atoms; and $R_2$ and $R_3$ are the same $C_1$–$C_{20}$ radical or a combination of different $C_1$–$C_{20}$ radicals, which optionally include O, Cl or Br atoms;

(3) a diphosphate ester having the formula:

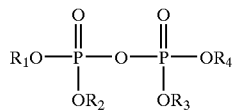

wherein $R_1$ and $R_4$ can be hydrogen atoms or $C_1$–$C_{20}$ radicals, which optionally include O, Cl or Br atoms, and $R_2$ and $R_3$ are the same $C_1$–$C_{20}$ radical or a combination of different $C_1$–$C_{20}$ radicals, which optionally include O, Cl or Br atoms; and (4) a phosphonate ester having the formula:

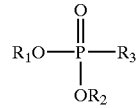

wherein $R_1$ is a hydrogen atom or a $C_1$–$C_{20}$ radical, which optionally includes O, Cl or Br atoms, and $R_2$ and $R_3$ are the same $C_1$–$C_{20}$ radical or a combination of different $C_1$–$C_{20}$ radicals, which optionally include O, Cl or Bratoms.

Preferably, the phosphorus-containing compound is selected from the phosphate ester of group (1) above wherein $R_1$, $R_2$ and $R_3$ are the same $C_1$–$C_{20}$ radical or a combination of different $C_1$–$C_{20}$ radicals, which optionally include O, Cl or Br atoms, or the phosphate ester of group (2) wherein R is derived from a diol; $R_1$, $R_2$, $R_3$ and $R_4$ are the same $C_1$–$C_{20}$ radical or a combination of different $C_1$–$C_{20}$ radicals, which optionally include O, Cl or Br atoms.

Specific examples of phosphorus compounds that can be used in this invention include, but are not limited to, trimethyl phosphate, triethyl phosphate, tributyl phosphate, tributoxyethyl phosphate, tris(2-ethylhexyl) phosphate, trioctyl phosphate, triphenyl phosphate, tritolyl phosphate, ethylene glycol phosphate, triethyl phosphonoacetate, dimethyl methyl phosphonate, tetraisopropyl methylenediphosphonate, and Merpol A.

The phosphorus-containing compound preferably contains no more than one —OH group bonded to each phosphorus molecule because the polycondensation rate is faster as compared to the polycondensation rate when more than one —OH group is directly bonded to phosphorus.

The phosphorus-containing compound can be added anytime during the process. Preferably, the phosphorus-containing compound is added before or after the reaction of the diacid component and glycol component because a faster polycondensation rate is achieved. More preferably, the phosphorus-containing compound is added before the esterification or transesterification reaction because the polycondensation rate is fastest when the phosphorus-containing compound is added at this point.

For esterification, a catalyst may or may not be utilized. The amount of esterification catalyst is from 0 to 500 ppm, preferably 10 to 200 ppm, more preferably 20 to 100 ppm. For transesterification, the presence of a sufficient amount of a transesterification catalyst is required at an amount of 1 to 500 ppm, preferably 10 to 200 ppm, more preferably 20 to 100 ppm. Examples of esterification or transesterification catalysts that can be used are manganese, zinc, magnesium, calcium, titanium, silver, molybdenum, gold, cobalt, nickel, potassium, sodium, lithium, rubidium, cesium, strontium, barium, copper, silver, mercury, tin, cadmium, bismuth, aluminum, chromium, zirconium, iron and lead. Preferably, such catalyst does not increase the amount of isomerization of trans-DMCD units during the formation of the polymer to counter the effect of the addition of phosphorus or appreciably increase the yellowness or darkness of the polymer. For this reason, esterification and transesterification catalysts such as titanium, calcium, strontium, chromium, zirconium and aluminum are preferred.

Polycondensation catalysts are present in an amount of 1 to 500 ppm, preferably 5 to 200 ppm and more preferably 20 to 100 ppm. Suitable polycondensation catalysts preferably include titanium, germanium, zirconium and aluminum because they do not increase the amount of trans-DMCD isomerization or negatively impact the polymer's color.

Similar to phosphorus, the esterification, transesterification and polycondensation catalysts are not added to the process in their elemental form but rather added as metal-containing compounds well known in the art. The parts by weight of the metals added are the parts of the elemental metal and are based on the weight of the reactor grade polyester produced by the process.

The most preferred catalyst for the present invention is titanium utilized both as the esterification or transesterification catalyst and the polycondensation catalyst. The preferred molar ratio of phosphorus from the phosphorus-containing compound to titanium is about 0.2 to 2.4. More preferably, the ratio is about 0.4 to 1.4. Examples of titanium-containing compounds that can be used are, but not limited to, tetraisopropyl titanate, acetyl triisopropyl titanate, tetrabutyl titanate, titanium diisopropoxide bis (2,4-pentanedionate), and tetrakis(2-ethylhexyl) orthotitanate.

The diacid component of the PCCD polyester comprises repeat units from at least about 80 mole percent, preferably 90 mole percent, and more preferably 100 mole percent, of CHDA. The diacid component of the PCCD polyester may be optionally modified with up to about 20 mole percent, preferably 10 mole percent, of one or more dicarboxylic acids. Such modifying dicarboxylic acids include aromatic dicarboxylic acids preferably having 8 to 14 carbons or their ester derivatives, aliphatic dicarboxylic acids preferably having 4 to 12 carbon atoms or their ester derivatives, and cycloaliphatic dicarboxylic acids having 8 to 12 carbons or their ester derivatives. Examples of dicarboxylic acids which could be used as modifiers include terephthalic acid; phthalic acid; isophthalic acid; napthalene-2,6-dicarboxylic acid; cyclohexanediacetic acid; diphenyl-4,4'-dicarboxylic acid; succinic acid; glutaric acid; adipic acid; azealic acid; and sebacic acid. Ester derivatives of these acids may be used in the process of preparing the PCCD polyester.

The glycol component of the PCCD polyester comprises repeat units from at least about 80 mole percent, preferably 90 mole percent, more preferably 100 mole percent, of CHDM. The glycol component of the polyester may be optionally modified with up to about 20 mole percent, preferably 10 mole percent, of one or more diols. Such modifying diols include cycloaliphatic diols preferably having 6 to 20 carbons, aliphatic diols preferably having 3 to 20 carbon atoms, and polyether glycols. Examples of such diols are ethylene glycol, diethylene glycol; triethylene glycol; propane-1,3-diol; butane-1,4-diol; pentane-1,5-diol; hexane-1,6-diol; neopentyl glycol; 2,4-dihydroxy-1,1,3,3-tetramethylcyclobutane; and poly(tetramethylene ether glycol).

Furthermore, the PCCD polyester may contain small amounts (less than 1 weight percent based on the weight of the polyester) of trifunctional or tetrafunctional comonomers such as trimellitic anhydride, trimethylolpropane, pyromellitic dianhydride, pentaerythritol and other polyester-forming polyacids or polyols generally known in the art.

In another embodiment, the present invention is a reaction product polyester composition of PCCD having an inherent viscosity (IV) of 0.4 to 2.0 dL/g, preferably 0.8 to 1.2 dL/g. IV is measured at 25° C. using a polymer concentration of 0.5 wt % in a solvent consisting of 60% phenol and 40% 1,1,2,2-tetrachlorethane. The reaction product polyester composition comprises a diacid component of residues of at least about 80 mole percent of 1,4-cyclohexanedicarboxylic acid, based on 100 mole percent diacid component; a glycol component of residues of at least about 80 mole percent of 1,4-cyclohexanedimethanol, based on 100 mole percent glycol component; 0 to 500 ppm esterification catalyst or 1 to 500 ppm transesterification catalyst; 1 to 500 ppm polycondensation catalyst, and 1 to 800 ppm phosphorus in the form of the phosphorus-containing compound described above; all parts per weight based on the weight of the polyester. The preferred embodiments related to the process described above are applicable to the reaction product polyester composition.

This invention can be further illustrated by the following examples of preferred embodiments thereof, although it will be understood that these examples are included merely for purposes of illustration and are not intended to limit the scope of the invention unless otherwise specifically indicated.

EXAMPLES

Example 1

This example illustrates the effect of the phosphate ester, triphenyl phosphate, on the properties of PCCD. To a 500-milliliter (mL) roundbottom flask was charged 100.1 grams (g) (0.4 moles) dimethylcyclohexane dicarboxylate (DMCD), 72.1 g (0.4 moles) 1,4-cyclohexanedimethanol (CHDM) and 70 parts per million (ppm) titanium as titanium (IV) isopropoxide. The DMCD starting material was analyzed to contain 98.5 weight percent (wt %) trans-isomer and 1.5 wt % cis-isomer. The CHDM monomer contained 70 wt % trans-isomer and 30 wt % cis-isomer. After charging the reactants, the flask was connected to a polymerization reactor that was equipped with an overhead stirrer, nitrogen inlet, condensing flask and vacuum source. A molten bath of Belmont metal preheated to 185° C. was raised to surround the flask. The Belmont metal bath temperature was increased from 185° C. to 220° C. over a 30-minute period with a slow stream of nitrogen bleeding into the system. The reaction was stirred at a speed of 100 rotations per minute (rpm). The temperature was held at 220° C. for 30 minutes to complete the ester exchange reaction period. At this stage, 50 ppm phosphorus as triphenyl phosphate was added to the flask through the nitrogen port. The temperature was then increased to 270° C. over a 25-minute period. After stopping the nitrogen flow, the pressure was reduced from atmospheric pressure to 0.5 torr and the stir speed slowed from 100 rpm to 20 rpm over a ten-minute period. The polycondensation reaction was continued under these conditions for five hours. At the completion of the reaction, the flask was removed from the Belmont metal bath and the polymer cooled under a nitrogen atmosphere. The polymer was recovered from flask and ground in a Wiley mill to a particle size of about 6 mm. The inherent viscosity (IV) was measured at 25° C. using a polymer concentration of 0.5 wt % in a solvent consisting of 60 wt % phenol and 40 wt % 1,1,2,2-tetrachlorethane. Polymer yellowness and brightness were measured with a Hunter Ultrascan instrument and reported in CIELAB units. Titanium and phosphorus concentrations were measured by x-ray fluorescence. The amount of cis-DMCD units in the polymer was obtained by nuclear magnetic resonance spectroscopy.

Example 2

This example illustrates the effect of the phosphate ester, Merpol A, on the properties of PCCD. Merpol A is commercially available from Stepan, Co. The procedure of Example 1 was followed, except that 18 ppm phosphorus from Merpol A was added to the flask instead of triphenylphosphate.

Example 3

This example illustrates the effect of phosphoric acid on the properties of PCCD. The procedure of Example 1 was used, except that 49 ppm phosphorus from phosphoric acid was added instead of triphenylphosphate.

Comparative Example 1

This example illustrates the properties of PCCD without any phosphate compound added. The procedure of Example 1 was followed, except that no phosphorus compound was added.

Example 4

This example shows the effect of the phosphite stabilizer, distearyl pentaerythritol diphosphite (Weston 619), on the properties of PCCD. The procedure of Example 1 was used, except that 31 ppm phosphorus from Weston 619 was added instead of triphenylphosphate.

Example 5

This example also shows the effect of a phosphite stabilizer on PCCD properties. The procedure of Example 4 was used, except that 43 ppm phosphorus from the phosphite bis(2,4-di-tertbutylphenyl) pentaerythritol diphosphite (Ultranox 626) was added instead of Weston 619.

Example 6

This example illustrates the effect of phosphorous acid ($H_3PO_3$) on the properties of PCCD. The procedure of Example 4 was used, except that 43 ppm phosphorus from phosphorous acid was added instead of Weston 619.

Comparative Example 2

This example shows the properties of PCCD made without any phosphite added. The procedure of Example 4 was followed, except that no phosphite was added.

The results for Examples 1 through 3 and Comparative Example 1 in Table 1 illustrate the effect of phosphate esters on the properties of PCCD. The addition of a phosphate ester to the reaction process decreases the amount isomerization of trans-DMCD to the cis isomer. The results also show that the addition of phosphate esters produced polymer with a higher IV than the control, whereas the addition of phosphoric acid decreased the polymer IV. This indicates that the polymerization rate is slowed when a phosphorus compound with a high number of acidic —OH groups bonded to phosphorus is used. A slower polymerization rate is not desired because it increases the amount of time needed in the polymerization reactor to reach the targeted polymer IV, thus increasing the amount of time available for the trans-to-cis isomerization of DMCD. Therefore, the use of neutral phosphorus compounds is preferred over those that contain a high number of acidic —OH groups bonded to phosphorus.

Examples 4 through 7 and Comparative Example 2 in Table 1 illustrate the effect of phosphites on the on the properties of PCCD. These compounds have the following general structure:

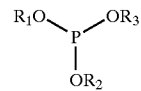

where R1, R2 and R3 are selected from the group of alkyl, aryl or hydrogen substituents. These compounds are different from phosphates in the oxidation state of phosphorus. The oxidation state of phosphorus in phosphites is +3, compared to +5 in phosphates. The data show that although the use of phosphites in PCCD retards the amount of trans-to-cis-isomerization of DMCD, the use of phosphites also undesirably slows the polycondensation rate as indicated by the lower polymer IV. This is not a desirable effect because the required residence time in the reactor is increased to reach the desired polymer IV and allows more time for trans-to-cis isomerization to occur. Therefore, the use of neutral or acidic phosphite compounds to reduce isomerization in PCCD is not preferred.

Examples 7–13

The procedure of Example 2 was used except the phosphorus level from the phosphate ester Merpol A was varied from 17 to 114 ppm.

Comparative Example 3

The procedure of Examples 7 through 13 was used except no Merpol A was added.

The results for examples 7–13 and Comparative Example 3 are given in Table 2. Examples 7 to 13 illustrate the optimum P/Ti molar ratio when using a phosphate ester phosphorus source. The highest polymer IV and lowest cis-DMCD content occur at P/Ti molar ratios between about 0.4 and 1.4. At P/Ti molar ratios greater than about 2.4, there is a significant drop in polymer IV. Therefore, P/Ti molar ratios less than 2.4 are preferred and furthermore, molar ratios of about 0.4 to 1.4 are most preferred.

Examples 14–25

The procedure of Example 1 was used except that a co-catalyst was added to the reaction flask in addition to the 70 ppm titanium as titanium (IV) isopropoxide. In Example 14, 50 ppm lithium as lithium acetate was added. In Example 15, 50 ppm sodium as sodium acetate was added. In Example 16, 50 ppm rubidium as rubidium acetate was added. In Example 17, 50 ppm cesium as cesium acetate was added. In Example 18, 50 ppm strontium as strontium acetate was added. In Example 19, 50 ppm manganese as manganese acetate was added. In Example 20, 50 ppm nickel as nickel acetate was added. In Example 21, 50 ppm cadmium as cadmium acetate was added. In Example 22, 50 ppm tin as dibutyltin diacetate was added. In Example 23, 50 ppm chromium as chromium (III) acetate was added. In Example 24, 50 ppm silver as silver acetate was added. In Example 25, 50 ppm molybdenum as molybdenum acetate was added.

Comparative Example 4

This example illustrates the properties of PCCD without any co-catalyst added. The method of Examples 14 to 25 was followed, except no co-catalyst was added.

Examples 26–31

The procedure of Examples 14 to 25 was used to evaluate additional co-catalysts with titanium. In Example 26, 50 ppm calcium as calcium acetate was added. In Example 27, 50 ppm lead as lead (II) acetate was added. In Example 28, 50 ppm germanium as germanium dioxide was added. In Example 29, 50 ppm antimony as antimony (III) oxide was added. In Example 30, 50 ppm magnesium as magnesium acetate was added. In Example 31, 50 ppm gold as gold (III) acetate was added.

Comparative Example 5

This example was carried out to determine the properties of PCCD without co-catalyst. The process of Examples 26–31 was followed but no co-catalyst was added.

Examples 32–35

These examples followed the same process for Examples 14 to 25, except different co-catalysts were evaluated. In example 32, 50 ppm zinc as zinc acetate was added. In example 33, 50 ppm cobalt as cobalt acetate was added. In example 34, 50 ppm barium as barium acetate was added. In example 35, 50 ppm aluminum as aluminum acetate was added.

Comparative Example 6

The method for Examples 32 to 35 was carried out for Comparative Example 6, except no co-catalyst was added.

Examples 36–39

These examples followed the procedure of Examples 14–25 except that different co-catalysts were evaluated. In Example 36, 50 ppm bismuth as bismuth acetate was added. In Example 37, 50 ppm zirconium as zirconium isopropoxide was added. In Example 38, 50 ppm copper was added as copper (II) acetate. In Example 39, 50 ppm iron was added as iron (III) acetate.

Comparative Example 7

The same procedure for Examples 36–39 was followed but no co-catalyst was added.

The results of Examples 15 to 39 in Table 3 illustrate the effect of co-catalysts in conjunction with titanium on the polymer properties and the amount of trans-to-cis-isomerization of DMCD. Lithium, sodium, rubidium, cesium, manganese, nickel, cadmium, tin, molybdenum, lead, magnesium, gold, zinc, cobalt and iron co-catalysts all resulted in higher levels of cis-DMCD units in the polymer than the control and are therefore not preferred to make PCCD with a low level of trans-DMCD units. Calcium, germanium, strontium and zirconium co-catalysts had very little or no effect on the amount of DMCD isomerization. Antimony, barium, chromium, copper, bismuth, silver and aluminum all resulted in a lower amount of cis-DMCD units in the polymer than the control. However, the polymers made with bismuth, copper, silver and antimony catalysts were unacceptably dark (low L*) compared to the control, presumably due to reduction of the ion to its metallic state. Therefore, the preferred co-catalysts are aluminum, barium, zirconium, strontium, chromium, calcium and germanium, which do not increase the level of trans-to-cis DMCD isomerization and give polymer with acceptable color.

Example 40

The method of Example 1 was used except that a two-neck roundbottom was used which was equipped with a sampling device in order to remove samples from the reaction while the flask remained under vacuum. No phosphate compound was added to the flask. Samples were removed approximately every thirty minutes during the final polycondensation stage. The samples were analyzed for IV and cis-DMCD units.

Example 41

The method of Example 40 was used except that 70 ppm P as the phosphate ester Merpol A was added before the start of the ester exchange stage.

Example 42

The method of Example 40 was used except that 70 ppm P as the phosphate Merpol A was added after the completion of the ester exchange stage.

Figure 2:
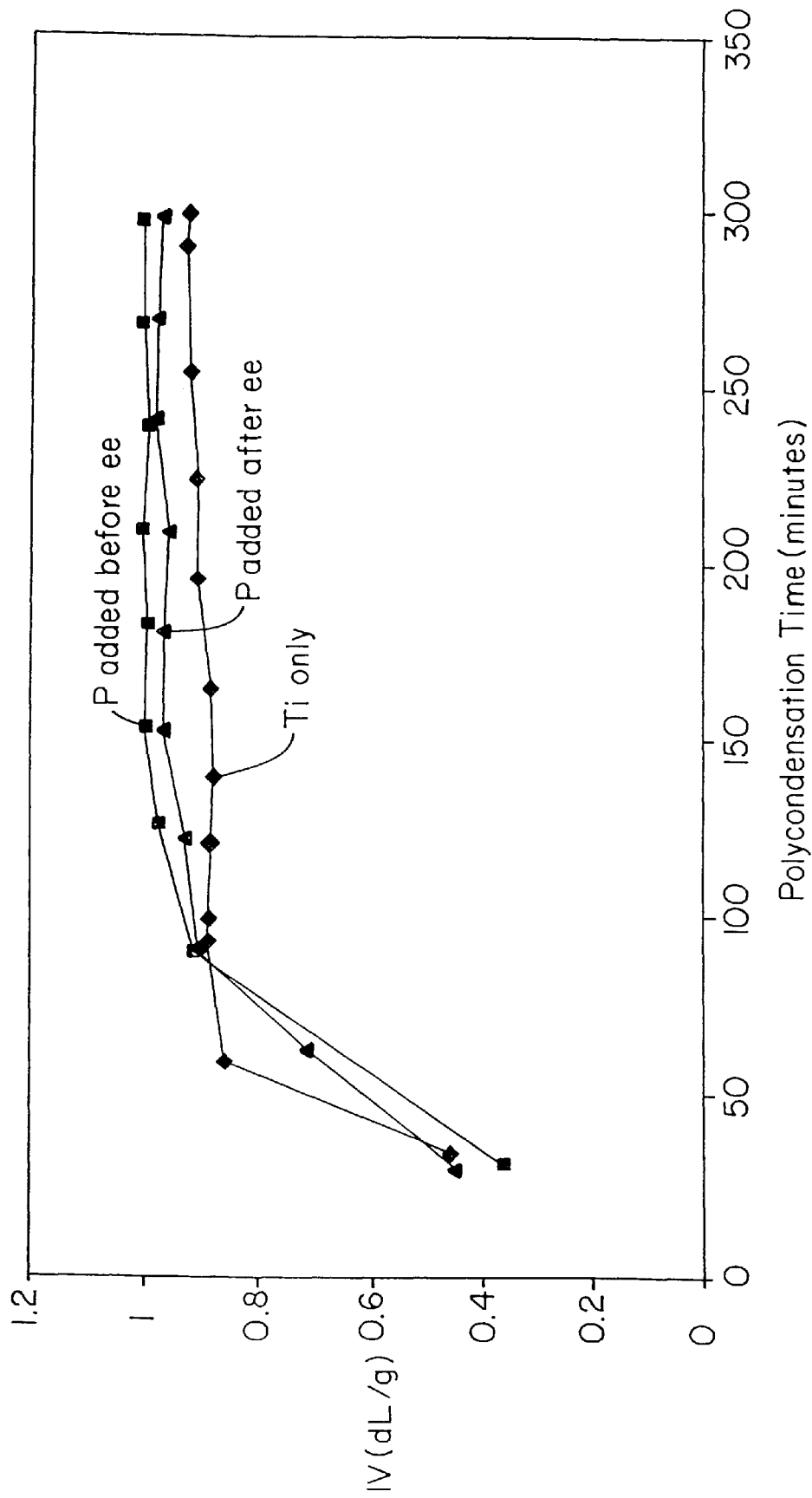
FIG. 2 is a graph of inherent viscosity versus polycondensation time illustrating that the addition of phosphorus in the form of a phosphate ester results in an increased polycondensation rate.
Figure 3:
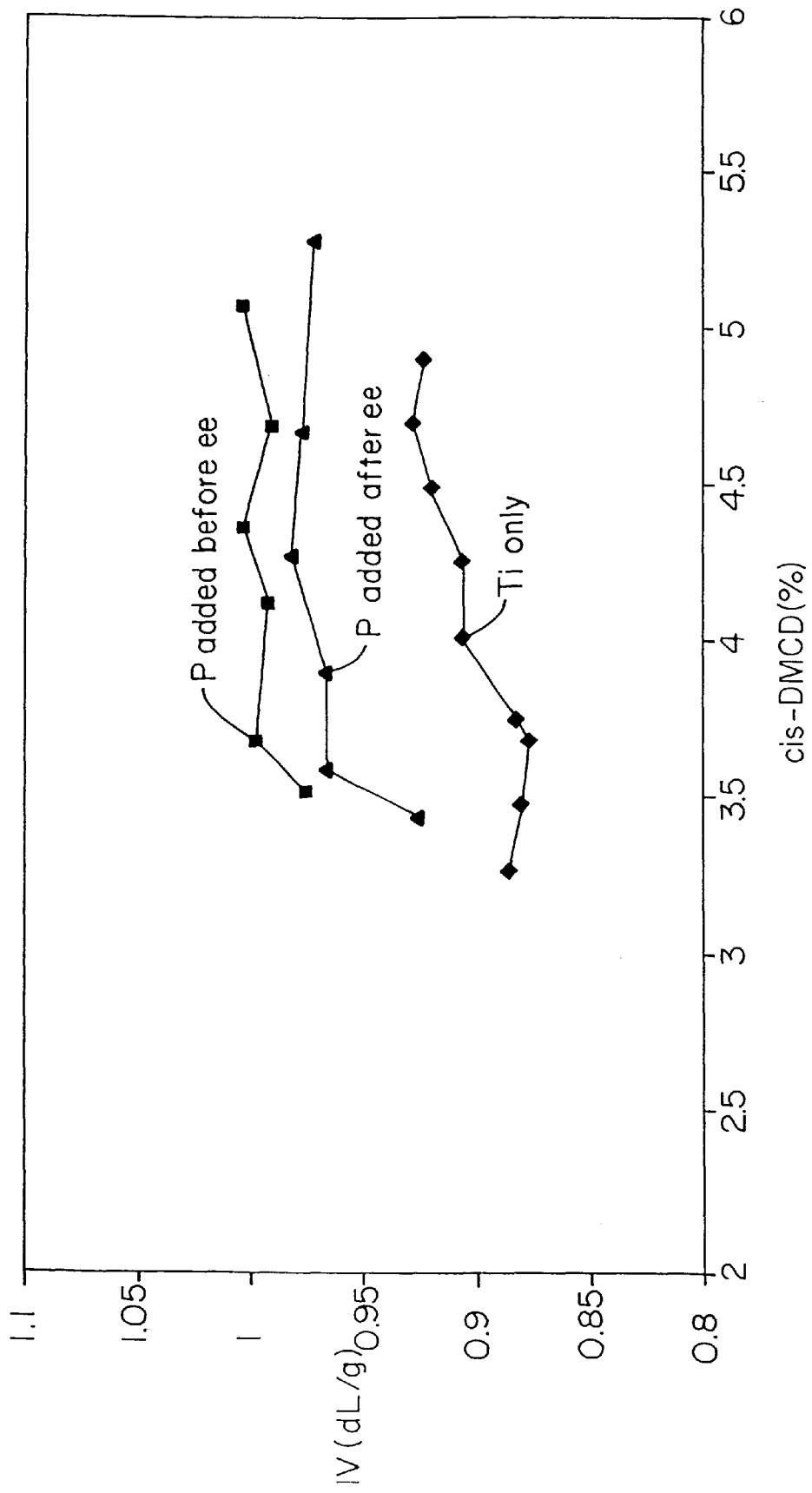
FIG. 3 is a graph of inherent viscosity versus percentage of cis-DMCD units illustrating that the addition of phosphorus in the form of a phosphate ester results in increase inherent viscosity.

The results of Examples 40 to 42 are plotted in FIGS. 2 and 3, which illustrate the effect of the phosphate ester Merpol A on the polycondensation rate and the cis-DMCD content. The data in FIG. 2 show that the addition of the Merpol A phosphate ester compound either before or after the ester exchange period leads to a faster polycondensation rate. The results further show that the polycondensation rate is faster when the phosphate compound is added at the start of the ester exchange period. In FIG. 3, IV is plotted against cis-DMCD units for Examples 40 to 42. This plot illustrates the beneficial effect of the phosphate ester compound on the amount of cis-DMCD units formed in the polymer. A higher IV and lower amount of cis-DMCD isomer are obtained when the phosphate ester is added. Further, it illustrates that the most beneficial feed location of the phosphate ester is before the ester exchange period.

TABLE 1

Evaluation of Phosphorus Additives in PCCD

| Example | Phosphorus Source | Phosphorus Oxidation State | IV (dL/g) | Cis-DMCD (%) | Ti (ppm) | P (ppm) | Molar ratio P/Ti |
|---|---|---|---|---|---|---|---|
| 1 | Triphenyl phosphate | +5 | 1.012 | 5.17 | 70 | 52 | 1.1 |
| 2 | Merpol A | +5 | 1.025 | 5.35 | 70 | 18 | 0.4 |
| 3 | Phosphoric Acid | +5 | 0.755 | 5.05 | 70 | 49 | 1.1 |
| Comparative 1 | None | | 0.956 | 6.80 | 69 | 0 | 0 |
| 4 | Weston 619 | +3 | 0.718 | 5.02 | 72 | 31 | 0.66 |
| 5 | Ultranox 626 | +3 | 0.937 | 5.23 | 73 | 43 | 0.90 |
| 6 | Phosphorous Acid | +3 | 0.846 | 5.11 | 66 | 43 | 1.0 |
| Comparative 2 | None | | 1.056 | 6.68 | 70 | 0 | 0 |

TABLE 2

Effect of P/Ti Molar Ratio on PCCD Properties Using Merpol A Phosphate Ester

| Example | IV (dL/g) | cis-DMCD (%) | Ti (ppm) | P (ppm) | molar ratio P/Ti |
|---|---|---|---|---|---|
| 7 | 1.000 | 5.02 | 72 | 17 | 0.4 |
| 8 | 1.021 | 4.51 | 72 | 35 | 0.8 |
| 9 | 0.989 | 4.44 | 74 | 51 | 1.1 |
| 10 | 0.918 | 4.35 | 74 | 66 | 1.4 |
| 11 | 0.727 | 4.50 | 73 | 86 | 1.8 |
| 12 | 0.571 | 3.78 | 74 | 102 | 2.1 |
| 13 | 0.406 | 3.22 | 73 | 114 | 2.4 |
| Comparative 3 | 0.931 | 5.66 | 72 | 0 | 0 |

TABLE 3

Evaluation of Co-Catalysts in PCCD

| Example | Co-catalyst | IV (dL/g) | b* | L* | cis-DMCD (%) | Ti (ppm) |
|---|---|---|---|---|---|---|
| 14 | Li | 0.971 | 7.3 | 79.5 | 28.62 | 61 |
| 15 | Na | 0.990 | 7.5 | 83.7 | 16.43 | 62 |
| 16 | Rb | 1.002 | 7.8 | 83.9 | 16.77 | 68 |
| 17 | Cs | 0.970 | 7.5 | 82.8 | 18.79 | 67 |
| 18 | Sr | 1.093 | 5.7 | 85.0 | 5.96 | 67 |
| 19 | Mn | 1.043 | 10.2 | 82.8 | 11.69 | 63 |
| 20 | Ni | 1.066 | 4.5 | 71.0 | 6.43 | 69 |
| 21 | Cd | 1.009 | 6.2 | 86.0 | 7.80 | 70 |
| 22 | Sn | 1.000 | 8.9 | 83.8 | 14.84 | 66 |
| 23 | Cr | 0.975 | 3.6 | 83.9 | 4.92 | 73 |
| 24 | Ag | 1.000 | 30.1 | 72.1 | 5.24 | 67 |
| 25 | Mo | 1.040 | 7.7 | 72.5 | 12.55 | 66 |
| Comp. 4 | None | 0.911 | 4.5 | 86.2 | 5.54 | 67 |
| 26 | Ca | 1.043 | 6.4 | 85.6 | 6.91 | 63 |
| 27 | Pb | 1.075 | 6.9 | 77.6 | 15.37 | 66 |
| 28 | Ge | 1.046 | 6.0 | 84.4 | 6.88 | 64 |
| 29 | Sb | 1.077 | 1.3 | 71.8 | 6.03 | 68 |
| 30 | Mg | 1.108 | 9.8 | 83.4 | 13.51 | 63 |
| 31 | Au | 0.993 | -1.2 | 74.9 | 9.72 | 71 |
| Comp. 5 | None | 1.049 | 7.0 | 85.1 | 6.68 | 69 |
| 32 | Zn | 1.041 | 4.8 | 85.9 | 9.35 | 63 |
| 33 | Co | 0.909 | 1.7 | 77.7 | 9.64 | 66 |
| 34 | Ba | 0.871 | 3.5 | 88.8 | 5.36 | 63 |
| 35 | Al | 0.949 | 3.3 | 88.8 | 5.09 | 66 |
| Comp. 6 | None | 1.056 | 4.8 | 87.6 | 6.68 | 70 |
| 36 | Bi | 1.305 | 2.3 | 78.0 | 6.42 | 66 |
| 37 | Zr | 1.068 | 4.9 | 87.5 | 7.00 | 66 |
| 38 | Cu | 0.958 | 1.5 | 57.4 | 5.97 | 65 |
| 39 | Fe | 1.004 | 9.3 | 75.4 | 16.46 | 65 |
| Comp. 7 | None | 0.956 | 4.6 | 88.6 | 6.80 | 69 |

What is claimed is:

1. A process for producing a reactor grade polyester of poly(1,4-cyclohexylenedimethylene 1,4-cyclohexanedicarboxylate) comprising the steps of:

a) reacting a diacid comprising at least 80 mole percent 1,4-cyclohexanedicarboxylic acid or an ester derivative of the diacid comprising at least 80 mole percent 1,4-dimethylcyclohexanedicarboxylate and a glycol comprising at least 80 mole percent 1,4-cyclohexanedimethanol at a temperature sufficient to effect esterification for the diacid or transesterification for the ester derivative, wherein the diacid or the ester derivative is based on 100 mole percent and the glycol is based on 100 mole percent;

b) polycondensing the product of step (a) at temperatures and pressures in the presence of a suitable catalyst to effect polycondensation;

c) adding 1 to 800 ppm phosphorus, wherein all parts by weight are based on the weight of the polyester and the phosphorus is added in the form of a phosphorus-containing compound; and d) after step (c) removing a reactor grade polyester of poly(1,4-cyclohexylenedimethylene 1,4-cyclohexanedicarboxylate) having an inherent viscosity of 0.4 to 2.0 dL/g;

wherein the phosphorus-containing compound is selected from the group consisting of:

(1) a phosphate ester having the formula:

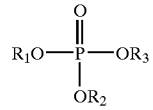

wherein $R_1$ is a hydrogen atom or a $C_1$–$C_{20}$ radical, and $R_2$ and $R_3$ are the same $C_1$–$C_{20}$ radical or a combination of different $C_1$–$C_{20}$ radicals;

(2) a phosphate ester having the formula:

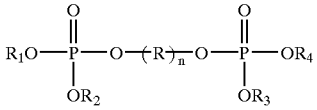

wherein R is derived from a diol; $R_1$ and $R_4$ can be hydrogen atoms or $C_1$–$C_{20}$ radicals; and $R_2$ and $R_3$ are the same $C_1$–$C_{20}$ radical or a combination of different $C_1$–$C_{20}$ radicals;

(3) a diphosphate ester having the formula:

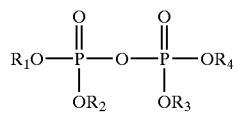

wherein $R_1$ and $R_4$ can be hydrogen atoms or $C_1$–$C_{20}$ radicals, and $R_2$ and $R_3$ are the same $C_1$–$C_{20}$ radical or a combination of different $C_1$–$C_{20}$ radicals; and (4) a phosphonate ester having the formula:

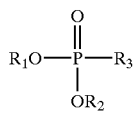

wherein $R_1$ is a hydrogen atom or a $C_1$–$C_{20}$ radical, and $R_2$ and $R_3$ are the same $C_1$–$C_{20}$ radical or a combination of different $C_1$–$C_{20}$ radicals.

2. The process of claim 1 wherein step (c) adding the phosphorus-containing compound occurs prior to step (a).

3. The process of claim 1 wherein step (c) adding the phosphorus-containing compound occurs prior to step (b).

4. The process of claim 1 wherein the phosphorus-containing compound contains no more than one —OH group bonded to each phosphorus molecule.

5. The process of claim 1 wherein the phosphorus-containing compound is selected from the group consisting of trimethyl phosphate, triethyl phosphate, tributyl phosphate, tributoxyethyl phosphate, tris(2-ethylhexyl) phosphate, trioctyl phosphate, triphenyl phosphate, tritolyl phosphate, ethylene glycol phosphate, triethyl phosphonoacetate, dimethyl methyl phosphonate, and tetraisopropyl methylenediphosphonate.

6. The process of claim 1 wherein the phosphorus-containing compound is selected from the group consisting of the phosphate ester of group (1) wherein $R_1$, $R_2$ and $R_3$ are the same $C_1$–$C_{20}$ radical or a combination of different $C_1$–$C_{20}$ radicals, and the phosphate ester of group (2) wherein R is derived from a diol; $R_1$, $R_2$, $R_3$ and R4 are the same $C_1$–$C_{20}$ radical or a combination of different $C_1$–$C_{20}$ radicals.

7. The process of claim 6 wherein the phosphorus-containing compound is selected from the group consisting of trimethyl phosphate, triphenyl phosphate, tributyl phosphate, trioctyl phosphate, tritolyl phosphate, tributoxyethyl phosphate, ethylene glycol phosphate and tris(2-ethylhexyl) phosphate.

8. The process of claim 1 wherein the diacid comprises at least 90 mole percent 1,4-cyclohexanedicarboxylic acid.

9. The process of claim 8 wherein the diacid comprises 100 mole percent of 1,4-cyclohexanedicarboxylic acid.

10. The process of claim 1 wherein the ester derivative comprises at least 90 mole percent 1,4-dimethylcyclohexanedicarboxylate.

11. The process of claim 10 wherein the ester derivative comprises 100 mole percent of 1,4-dimethylcyclohexanedicarboxylate.

12. The process of claim 1 wherein the glycol comprises at least 90 mole percent 1,4-cyclohexanedimethanol.

13. The process of claim 12 wherein the glycol comprises 100 mole percent 1,4-cyclohexanedimethanol.

14. The process of claim 1 further comprising an esterification catalyst or transesterification catalyst selected from the group consisting of titanium, calcium, barium, strontium, chromium, zirconium and aluminum.

15. The process of claim 1 wherein the suitable catalyst for polycondensation is selected from the group consisting of titanium, germanium, zirconium and aluminum.

16. The process of claim 1 wherein the esterification catalyst or transesterification catalyst and the suitable catalyst for polycondensation is titanium and the titanium is present in a molar ratio of phosphorus to titanium of 0.2 to 2.4.

17. The process of claim 16 wherein the molar ratio of phosphorus to titanium is 0.4 to 1.4.

18. The process of claim 1 wherein the phosphorus from the phosphorus-containing compound is added in an amount of 1 to 310 ppm.

19. The process of claim 18 wherein the phosphorus from the phosphorus-containing compound is added in an amount of 5 to 91 ppm.

20. A reactor grade polyester produced by the process of claim 1.

21. A reaction product polyester composition of poly(1, 4-cyclohexylenedimethylene 1,4-cyclohexanedicarboxylate) having an inherent viscosity of 0.4 to 2.0 dL/g comprising:

a) a diacid component of residues of at least about 80 mole percent of 1,4-cyclohexanedicarboxylic acid, based on 100 mole percent diacid component;

(b) a glycol component of residues of at least about 80 mole percent of 1,4-cyclohexanedimethanol, based on 100 mole percent glycol component;

c) 0 to 500 ppm esterification catalyst or 1 to 500 ppm transesterification catalyst;

d) 1 to 500 ppm polycondensation catalyst, and e) 1 to 800 ppm phosphorus present in the form of phosphorus-containing compound, all parts per weight based on the weight of the polyester;

wherein the phosphorus-containing compound is selected from the group consisting of: (1) a phosphate ester having the formula:

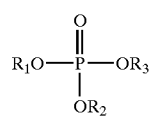

wherein $R_1$ is a hydrogen atom or a $C_1$–$C_{20}$ radical, and $R_2$ and $R_3$ are the same $C_1$–$C_{20}$ radical or a combination of different $C_1$–$C_{20}$ radicals;

(2) a phosphate ester having the formula:

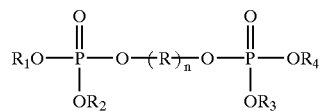

wherein R is derived from a diol; $R_1$ and $R_4$ can be hydrogen atoms or $C_1$–$C_{20}$ radicals; and $R_2$ and $R_3$ are the same $C_1$–$C_{20}$ radical or a combination of different $C_1$–$C_{20}$ radicals;

(3) a diphosphate ester having the formula:

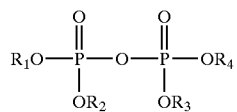

wherein $R_1$ and $R_4$ can be hydrogen atoms or $C_1$–$C_{20}$ radicals, and $R_2$ and $R_3$ are the same $C_1$–$C_{20}$ radical or a combination of different $C_1$–$C_{20}$ radicals; and (4) a phosphonate ester having the formula:

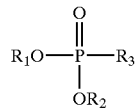

wherein $R_1$ is a hydrogen atom or a $C_1$–$C_{20}$ radical, and $R_2$ and $R_3$ are the same $C_1$–$C_{20}$ radical or a combination of different $C_1$–$C_{20}$ radicals.

22. The polyester composition of claim 21 wherein the phosphorus-containing compound contains no more than one —OH group bonded to each phosphorus molecule.

23. The polyester composition of claim 21 wherein the phosphorus-containing compound is selected from the group consisting of trimethyl phosphate, triethyl phosphate, tributyl phosphate, tributoxyethyl phosphate, tris(2-ethylhexyl) phosphate, trioctyl phosphate, triphenyl phosphate, tritolyl phosphate, ethylene glycol phosphate, triethyl phosphonoacetate, dimethyl methyl phosphonate, and tetraisopropyl methylenediphosphonate.

24. The polyester composition of claim 21 wherein the phosphorus-containing compound is selected from the group consisting of the phosphate ester of group (1) wherein $R_1$, $R_2$ and $R_3$ are the same $C_1$–$C_{20}$ radical or a combination of different $C_1$–$C_{20}$ radicals and the phosphate ester of group (2) wherein R is derived from a diol; $R_1$, $R_2$, $R_3$ and $R_4$ are the same $C_1$–$C_{20}$ radical or a combination of different $C_1$–$C_{20}$ radicals.

25. The polyester composition of claim 21 wherein the phosphorus-containing compound is selected from the group consisting of trimethyl phosphate, triphenyl phosphate, tributyl phosphate, trioctyl phosphate, tritolyl phosphate, tributoxyethyl phosphate, ethylene glycol phosphate and tris(2-ethylhexyl) phosphate.

26. The polyester composition of claim 21 wherein the esterification catalyst or transesterification catalyst is selected from the group consisting of titanium, calcium, barium, strontium, chromium, zirconium and aluminum.

27. The polyester composition of claim 21 wherein the polycondensation catalyst is selected from the group consisting of titanium, germanium, zirconium and aluminum.

28. The polyester composition of claim 27 wherein esterification catalyst or transesterification catalyst and the polycondensation catalyst is titanium and the titanium is present in a molar ratio of phosphorus to titanium of 0.2 to 2.4.

29. The polyester composition of claim 28 wherein the molar ratio of phosphorus to titanium is 0.4 to 1.4.

30. The polyester composition of claim 21 wherein the phosphorus in the form of a phosphorous-containing compound is added in an amount of 1 to 310 ppm.

31. The polyester composition of claim 30 wherein the phosphorus in the form of phosphorus-containing compound is added in an amount of 5 to 91 ppm.

32. The polyester composition of claim 21 wherein the diacid component comprises residues of at least 90 mole percent 1,4-cyclohexanedicarboxylic acid.

33. The polyester composition of claim 32 wherein the diacid component comprises residues of 100 mole percent of 1,4-cyclohexanedicarboxylic acid.

34. The polyester composition of claim 21 wherein residues of the diacid component are derived from 1,4-dimethylcyclohexanedicarboxylate.

35. The polyester composition of claim 21 wherein the glycol component comprises residues of at least 90 mole percent 1,4-cyclohexanedimethanol.

36. The polyester composition of claim 35 wherein the glycol component comprises residues of 100 mole percent 1,4-cyclohexanedimethanol.

37. The process in accordance with claim 1 wherein said $C_1$–$C_{20}$ radical or a combination of different $C_1$–$C_{20}$ radicals of $R_1$–$R_4$ further includes a moiety selected from the group consisting of oxygen, chlorine or bromine.

38. The process in accordance with claim 6 wherein said $C_1$–$C_{20}$ radical or a combination of different $C_1$–$C_{20}$ radicals of $R_1$–$R_4$ further includes a moiety selected from the group consisting of oxygen, chlorine or bromine.

39. The reaction product polyester composition of claim 21 wherein said $C_1$–$C_{20}$ radical or a combination of different $C_1$–$C_{20}$ radicals of $R_1$–$R_4$ further includes a moiety selected from the group consisting of oxygen, chlorine or bromine.

40. The reaction product polyester composition of claim 24 wherein said $C_1$–$C_{20}$ radical or a combination of different $C_1$–$C_{20}$ radicals of $R_1$–$R_4$ further includes a moiety selected from the group consisting of oxygen, chlorine or bromine.

\* \* \* \* \*